United States Patent [19]

Mitzner

[11] Patent Number: 4,592,397

[45] Date of Patent: Jun. 3, 1986

[54] ARRANGEMENT FOR THE AUTOMATIC FILLING OF A CONTAINER

[75] Inventor: Horst Mitzner, Viersen, Fed. Rep. of Germany

[73] Assignee: Rheinische Maschinenfabrik & Eisengiesserei Anton Roper GmbH & Co. Kommanditgesellschaft, Dulken, Fed. Rep. of Germany

[21] Appl. No.: 666,881

[22] Filed: Oct. 31, 1984

[30] Foreign Application Priority Data

Nov. 8, 1983 [DE] Fed. Rep. of Germany ....... 3340266
Feb. 15, 1984 [DE] Fed. Rep. of Germany ....... 3405419

[51] Int. Cl.⁴ .............................................. B65B 1/04
[52] U.S. Cl. ...................................... 141/18; 141/94; 141/95; 222/66; 222/447; 222/450
[58] Field of Search ....................................... 141/1–12, 141/18–29, 94, 95, 96, 198; 222/66, 447, 450

[56] References Cited

U.S. PATENT DOCUMENTS 3,099,368  7/1963  Turner et al. .................... 222/66

Primary Examiner—Houston S. Bell, Jr.
Attorney, Agent, or Firm—Scully, Scott, Murphy & Presser

[57] ABSTRACT

An arrangement for the automatic control over the filling of a dosing or metering container with pourable or flowable material from a supply container, in a manner, such that a predetermined portion of the pourable material stored in the dosing container is withdrawn from the dosing container and a corresponding quantity of pourable material is automatically refilled into the container.

11 Claims, 4 Drawing Figures

ARRANGEMENT FOR THE AUTOMATIC FILLING OF A CONTAINER

BACKGROUND OF THE INVENTION

1. Field of the Invention

The present invention relates to an arrangement for the automatic control over the filling of a dosing or metering container with pourable or flowable material from a supply container, in a manner, such that a predetermined portion of the pourable material stored in the dosing container is withdrawn from the dosing container and a corresponding quantity of pourable material is automatically refilled into the container.

2. Discussion of the Prior Art

In the industrialized technology it is quite frequently common to control the withdrawal of pourable material from a container in a manner wherein a discharge cross-sectional area of a supply container is opened for a predetermined time interval, such that the quantity of pourable material exiting from the supply container is essentially obtained from the cross-sectional area of the discharge, the opening period of the discharge, and the flowability of the material. This solution is constructionally simple and dependable; nevertheless, the desired degree of exactness achievable thereby for the quantity of material which exits during each opening cycle of the discharge is, not always adequate. During a number of opening cycles, the flowability of the material can vary and the cross-section of the discharge orifice can itself become smaller through agglomerations of material about the edges thereof, or may change in general. Varying the opening period in a corresponding or compensating manner during a plurality of subsequent opening cycles was heretofore not possible due to a lacking correlation in the relationship among the three essential parameters.

For example, the achievable degree of preciseness in the determination of the quantity of material exiting or discharged during each opening cycle is not recommended as being adequate in the foundry or cast molding technology during the formation of molding cores. The strength of the cores, to a high degree, is dependent upon the currently exactly determined, employed sand quantity and the oxygen and moisture content factors.

SUMMARY OF THE INVENTION

Accordingly, it is an object of the present invention to provide an arrangement through the intermediary of which a dosing or metering container can have a quantity of pourable or flowable material refilled therein at an extreme degree of precision, in correspondence with the material previously withdrawn from the dosing container. The desired result should be achieved through the use of simple, functionally-dependent means.

BRIEF DESCRIPTION OF THE DRAWINGS

Reference may now be had to the following detailed description of an exemplary embodiment of the invention, taken in conjunction with the accompanying drawings; in which.

DETAILED DESCRIPTION

Figure 1:
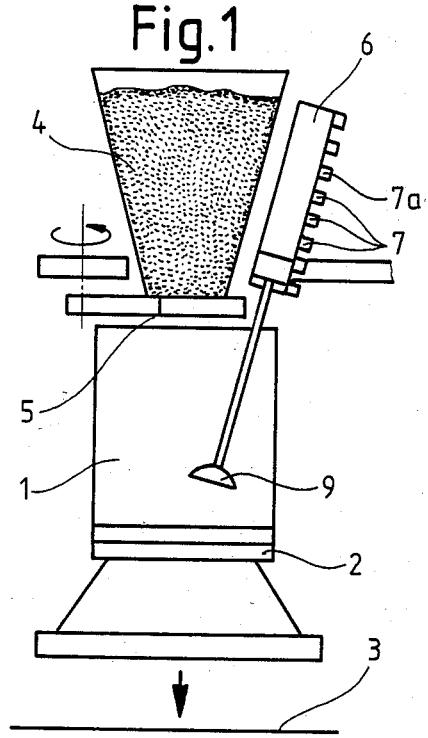
FIG. 1 schematically illustrates a sectional view through an arrangement for controlling the automatic filling of the dosing container in a first operative condition thereof.

Referring now in detail to the drawings, the arrangement includes a dosing or metering container 1 in which there is to be located a predetermined quantity of a pourable or flowable material, which is to be conducted from a lower material discharge orifice 2, for example, into a molding core forming arrangement 3. Consequently, it is an object of the invention to place within the dosing container 1 a predetermined quantity of the pourable material for one or more work cycles, and which is to be withdrawn from a supply container 4.

In order to achieve the foregoing object, the supply container 4 is equipped at the lower end thereof, above the dosing container 1, with a closure 5 which is movable between an opening and closing position, and the actuating device for the closure 5 as well as for the container 1, has a sensor device 6 associated therewith.

In accordance with the required degree of precision a plurality of sequentially located position sensing devices 7 add located along the longitudinal axis of one cylinder of the sensor device. Within the cylinder, a piston 8 is positively displaceable, and which cooperates with the position sensing devices in a mode to be described hereinbelow. The position of the piston 8 within the cylinder of the sensor device 6 corresponds with the position of a feeler in the dosing container 1, for which purpose the feeler 9 is mechanically connected with the piston 8 through a piston rod.

At the beginning of production, the desired rated filling height 10 in the container is selected through a selector switch of the type providing the usual machine control. Consequently, by means of the position sensing arrangements 7, there is activated the position sensing device 7a which is operatively associated with the rated filling height 10. Through the activation of different ones of the position sensing devices 7a, different rated filling heights can be selected for the container.

Figure 2:
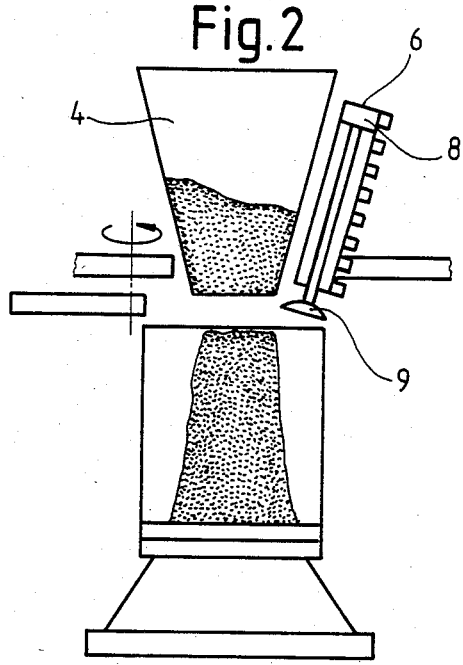
FIGS. 2 to 4 each illustrate the arrangement of FIG. 1 in different operating positions thereof.
Figure 3:
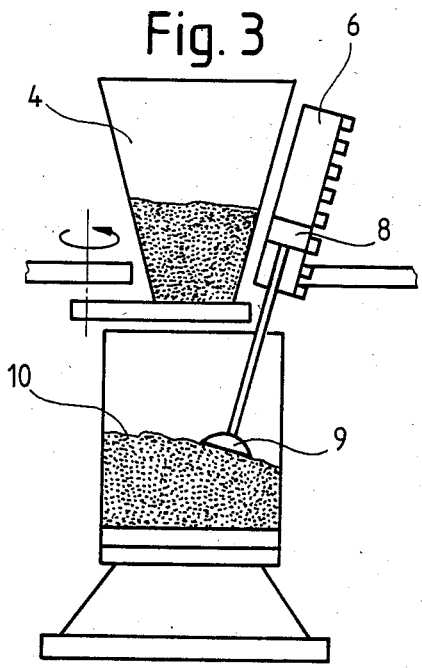
Figure 4:
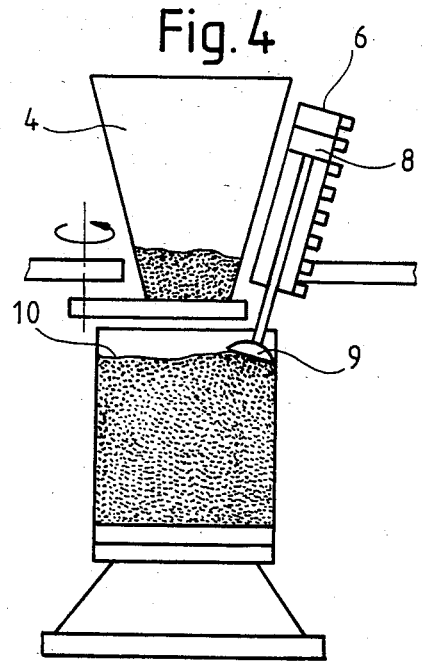

Upon triggering of the start command, through the positive forcible displacement of the piston 8 within the cylinder of the sensor device 6, the feeler 9 moves within the still empty or only partially filled container and into the lowermost end position of the feeler, and the piston 8 moves past the activated position sensing device 7a. By means of the lowermost of the non-activated position sensing devices, the direction of movement of the piston is reversed when the piston 8 reaches its lowermost end position (FIG. 1), and piston 8 and feeler 9 return into their starting position (FIG. 2). The lowermost of the non-activated position sensing devices is so connected in the electrical control circuit of the sensor device 6, that, upon this reversal in the direction of movement of the piston 8 and of the feeler 9, the closure 5 is opened (FIG. 2), and pourable material is discharged from the supply container 4 into the dosing container 1. The closure 5 is again returned into its closing position at a time associated with a preselected position. Through the position sensing device at the upper end of travel of the piston 8, the direction of movement of the piston 8 and of the feeler 9 is again changed. This sequence of events is repeated for so long until the feeler 9 contacts the material (which, in the interim, has been poured into the container 1) before the piston 8 engages the lowermost position sensing device. The feeler 9 finally strikes against the poured material (actual pouring material height) which has been conducted, in the interim, in the described manner into the container 1, when the piston 8 is located at the height of or above the activated position sensing device 7a (FIG. 4). In effect, the actual height of the poured material is equal to or higher than the rated height thereof. After a preset time interval, the direction of movement of the piston 8 and the feeler 9 are reversed without closure 5 opening.

If, after material rises above the rated height, closure 2 is opened, material from container 1 is conducted into molding core arrangement. If, while this occurs, feeler 9 and piston 8 are reciprocating as discussed above, the piston and feeler, in association with the selected sensor 7a, will operate as described above, to open closure 5 to allow material to pass into container 1 if the actual height of material therein falls below the rated height. More specifically, as long as the actual height of material in container 1 is above the selected height, when feeler 9 engages that material during downward movement of the feeler and piston 8, the direction of movement of the feeler and piston is reversed but without opening closure 5. In the region of the uppermost position sensing device, the direction of movement of piston 8 and feeler 9 are again reversed, however, without requiring that the closure 5 be closed. This sequence of operation, with a reversal in the direction of movement of the piston 8 and of the feeler 9 in the region of the uppermost position sensing device without any change in the position of the closure 5, is repeated until, through a withdrawal of the pourable material from the container 1, the actual fill material height has again dropped below the rated pourable material fill height 10, and the feeler 9 contacts the filled material after the piston 8 has traveled past the activated position sensing device 7a. After this, until the feeler 9 strikes the pourable material in the container 1 when the position of the piston 8 is opposite the activated position sensing device 7a, the reversing of the direction of movement of the piston 8 and feeler 9 is again repeated when the feeler 9 strikes the pourable material, with the concurrent opening of the closure 5.

In a modified embodiment of the invention, the striking of the feeler 9 against the upper surface of the pourable material causes the closure 5 to open and also causes the direction of movement of the feeler 9 and the piston 8 to reverse. There is an opposite reversing in the direction of movement of feeler 9 and piston 8 (however, without causing the closure 5 to close) when the piston reaches the uppermost end position. This sequence is repeated until the rated filling height 10 has been reached. Closure 5 is closed upon the piston 8 reaching the uppermost end position only after the feeler 9 strikes against the surface of the material in container 1 while the piston 8 is located at the height of the activated position device 7a, which indicates that the actual filling height corresponds to the rated filling height. The cooperation between the piston 8 and the activated position sensing device when the feeler 9 strike the material surface while the actual filling height and the rated filling height 10 correspond to each other, triggers a signal in the control arrangement. After this signal is triggered, the closure 5 is closed the next time the piston 8 and the feeler 9 reach their uppermost end position. The installation is retained in this operative position until a control impulse is triggered, which opens the closure 2. This control impulse concurrently initiates a renewed downward movement of the feeler 9 and, the latter strikes the pourable material surface after the piston 8 has traveled past the activated position sensing device 7a. This opens closure 5, and the closure remains open for so long until the preselected rated filling height 10 has been reached and the cooperation between the piston 8 and the position sensing device 7a retains the feeler 9 in its uppermost end position and closes the closure 5, as described hereinabove.

Pursuant to a further modified embodiment, at the beginning of the operation, the feeler 9 is placed into a forcible downward movement, while the closures 2 and 5 are closed. The piston 8 travels past the position sensing device 7a since the container 1 is not filled or the filling height lies below the rated filling height 10, and the movement of the piston 8 past the position sensing device 7a triggers a signal to open the closure 5 for a predetermined time period. Thereafter, the feeler 9 and the piston 8, which in the interim have returned to their uppermost starting position, are automatically deactivated, for example, by means of a timer, or manually by operating personnel, to a renewed working movement. If the container 1 is still not refilled up to its rated filling height, the above described procedure repeats itself for so long until the feeler 9, during a downward stroke thereof strikes the surface of the material after this material has reached the filling height 10. During this downward movement, the piston 8 no longer travels beyond the activated position sensing device 7a, and the closure 5 is not opened. Only after pourable material has been discharged through the material discharge opening 2, and the actual filling height has again dropped below the rated filling height 10, will the piston 8 again travel past the activated position sensing device 7a during the lowering of the feeler 9. When this happens, the closure 5 is again opened and the dosing container 1 is again filled to the desired measure.

The two last described embodiments have the advantage in comparison with the first-mentioned embodiment, of providing a particularly rapid filling of the dosing container 1.

It can be ascertained that, through the present invention, the pourable material quantity can be acurately introduced into the container 1 in an extremely simple manner, and with simple and functionally-dependent apparatus, in conformance with that which was previously withdrawn. During an operating cycle, a partial quantity of the pourable material in the container 1 can be withdrawn therefrom and the container refilled with that same partial quantity. Alternately, during each emptying sequence, the entire quantity of material in container can be discharged therefrom, and the container thereafter refilled with a like quantity of material. The quantity of the pourable material which is to be discharged can be readily programmed. The refilled quantity always corresponds extremely precisely to the withdrawn quantity when the position sensing devices are located close together in sequence.

The displacement of the feeler 9 can be carried out in any suitable manner; for example, by means of the piston 8 which can be displaced pneumatically or hydraulically in the cylinder of the sensing arrangement. Also an electrically-actuated displacement, for example, a stepping motor, can be used.

The described modes of operation can be provided through a suitable construction of an electrical control circuit. Hereby, this relates to measures which are available to any one skilled in the art, which are consequently not described in detail and, as such, are not claimed. It is important that the control circuit be constructed in a manner such that movement of the feeler 9 determines whether the actual filling height and rated filling height 10 coincide with each other, and whether, up to then, in one manner or another, pourable material is introduced from the supply container 4 into the dosing container 1.

In order to facilitate a correlation with different pourable materials, the feeler 9 can be replaceable, and a feeler can be inserted whose surface is correlated with the applicable pourable material, in such a configuration as not to penetrate the surface of the pourable material.

What is claimed is:

1. In an arrangement for the automatic control of the filling of a measuring container with a pourable material from a supply container, in which a predetermined portion of the pourable material stored in the measuring container is withdrawn therefrom and a corresponding quantity of pourable material automatically refilled therein; the improvement comprising:

means for selecting a rated height of material in the measuring container;

displaceable means supported for movement along a path of travel adjacent the selecting means and extending into the measuring container for sensing the actual height of material in the measuring container; and implementing means for for conducting and controlling the flow of material from the supply container into the measuring container and connected to the selecting means to add material to the measuring container for at least a portion of the time when the sensed level of material therein is below the rated material height.

2. An arrangement according to claim 1 wherein:
   the selecting means includes a plurality of position sensors located along the path of movement of the displaceable means;
   the supply container includes a discharge outlet leading into the measuring container for conducting material thereinto; and
   the implementing means opens the discharge outlet during said portion of time, and closes the discharge outlet after the sensed level of material in the measuring container reaches the rated height.

3. An arrangement according to claim 2 wherein:
   the displaceable means reciprocates upwardly and downwardly along the path of movement;
   the implementing means is connected to the displaceable means to reverse the direction of movement thereof at upper and lower ends of the path of travel of the displaceable means;
   when the sensed level of material in the measuring container is below the rated level, the implementing means (i) normally opens the discharge outlet during a selected one of the upwardly and downwardly movement of the displaceable means and (ii) normally closes the discharge outlet during the other one of the upwardly and downwardly movement of the displaceable means; and
   after the sensed level of material in the measuring container reaches the rated height, a selected position sensor generates a control signal to prevent the closure from opening during the following movement of the displaceable means.

4. An arrangement according to claim 2 wherein:
   the displaceable means reciprocates upwards and downwards along said path of movement;
   the implementing means normally reverses the direction of movement of the displaceable means at upper and lower ends of the path of travel thereof;
   the displaceable means includes a feeler to engage material in the measuring container;
   the implementing means
   (i) opens the discharge outlet during a selected reversal of movement of the displaceable means at the lower end of the path traveled thereof, the selected reversal occurring when the feeler engages the material in the measuring container below the rated height, and
   (ii) holds the discharge outlet open until the first time the displaceable means reaches the upper end of the path traveled thereof after the feeler engages the material in the container after that material has risen to the rated height.

5. An arrangement according to claim 2 wherein:
   the displaceable means reciprocates upwardly and downwardly along said path of movement;
   when the displaceable means reaches the lower end of the path of travel below the rated height, the implementing means returns the displaceable to the upper end of the path traveled and opens the discharge outlet for a predetermined length of time;
   when the displaceable means reaches the lower ends of the path of travel after the level of material in the measuring container rises to the rated height, the implementing means returns the displaceable means to the upper end of the path of travel while keeping the discharge outlet closed.

6. An arrangement according to claim 1, wherein:
   the supply container includes a discharge outlet leading to the measuring container to conduct material thereinto, and a closure controlling the flow of material through the discharge outlet; and
   the control means and the selected means form an electrical control circuit controlling the closure to selectively conduct material through the discharge outlet.

7. An arrangement according to claim 1 further comprising electrically actuated means to move the displaceable means along the path of travel.

8. An arrangement according to claim 1 further comprising a fluid actuated piston to move the displaceable means along the path traveled.

9. An arrangement according to claim 1 wherein:
   the displaceable means includes a feeler to engage the material in the measuring container and to stop downward movement of the displaceable means upon said engagement.

10. Apparatus for collecting a measured quantity of a flowable material comprising:
    a measuring container for holding the measured quantity of the material;
    a supply container for holding a supply of the material and having a discharge outlet leading into the measuring container to conduct the material thereinto;
    cover means located between the measuring and supply containers having a first position closing the discharge outlet and a second position opening the discharge outlet to pass material from the supply container into the measuring container;
    material level sensing means including
    (i) displaceable means supported for upward and downward movement along a path of travel extending into the measuring container to engage material in the measuring container when the material rises above a first level, and (ii) means to reciprocate the displaceable means along the path of travel; and control means connected to the cover means and to the material level sensing means, and including (i) means to control the reciprocating movement of the displaceable means, (ii) selecting means to determine a rated height of material in the measuring container, and (iii) means to hold the cover means in the second position during at least a portion of the time when the actual height of material in the measuring container is below the rated height, and to return the cover means to the first position after the actual height of material in the measuring container reaches the rated height.

11. Apparatus according to claim 10 wherein:

the selecting means includes a plurality of position sensors located adjacent and spaced apart along the path of travel; and the control means returns the cover means to the first position when the displaceable means engages material in the container while a selected portion of the displaceable means is adjacent a selected one of the position sensors.

* * * * *